Feb. 6, 1940.   M. P. BLOMBERG   2,189,125
RAILWAY CAR TRUCK
Filed Jan. 29, 1938   3 Sheets-Sheet 1
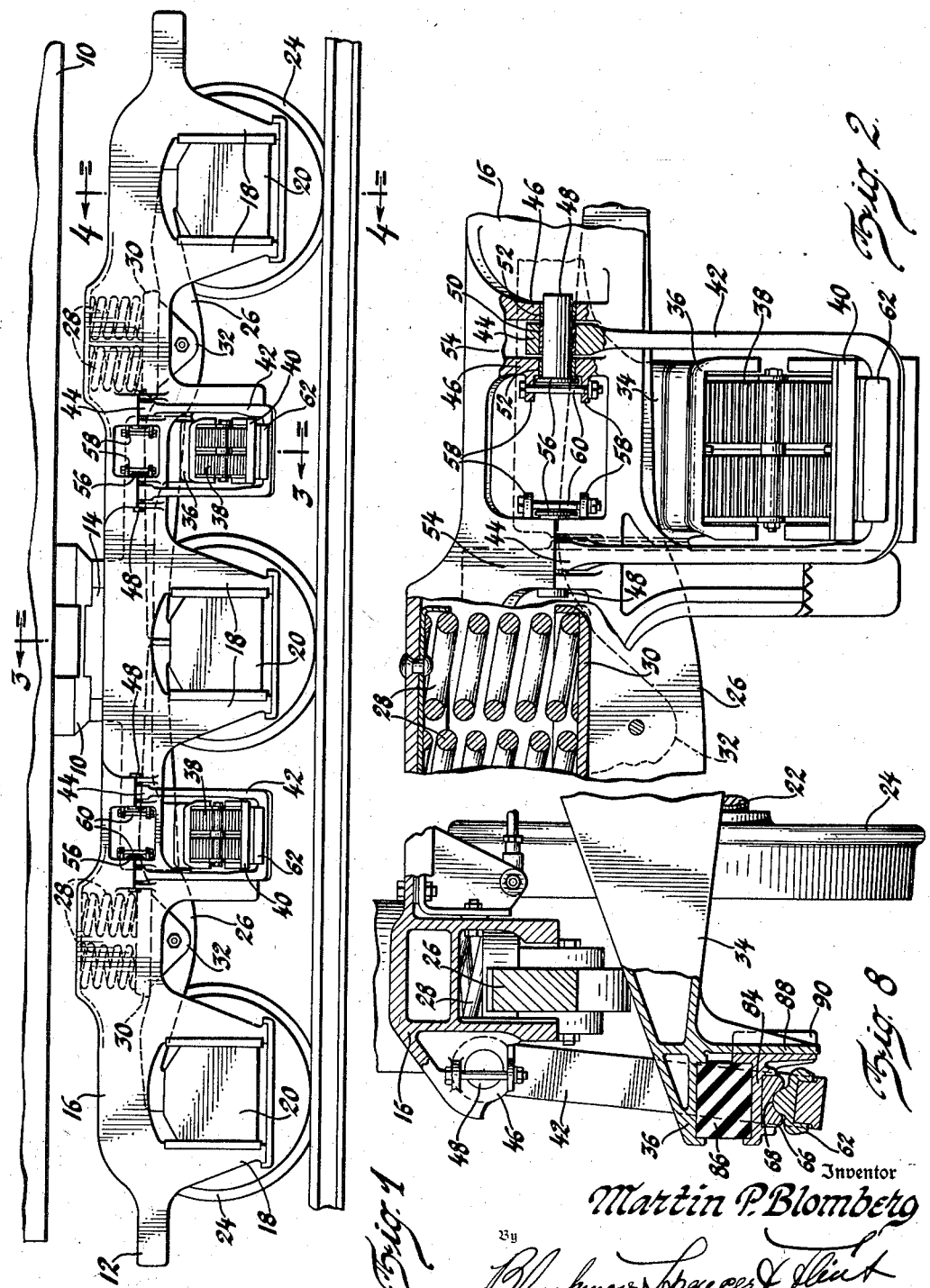

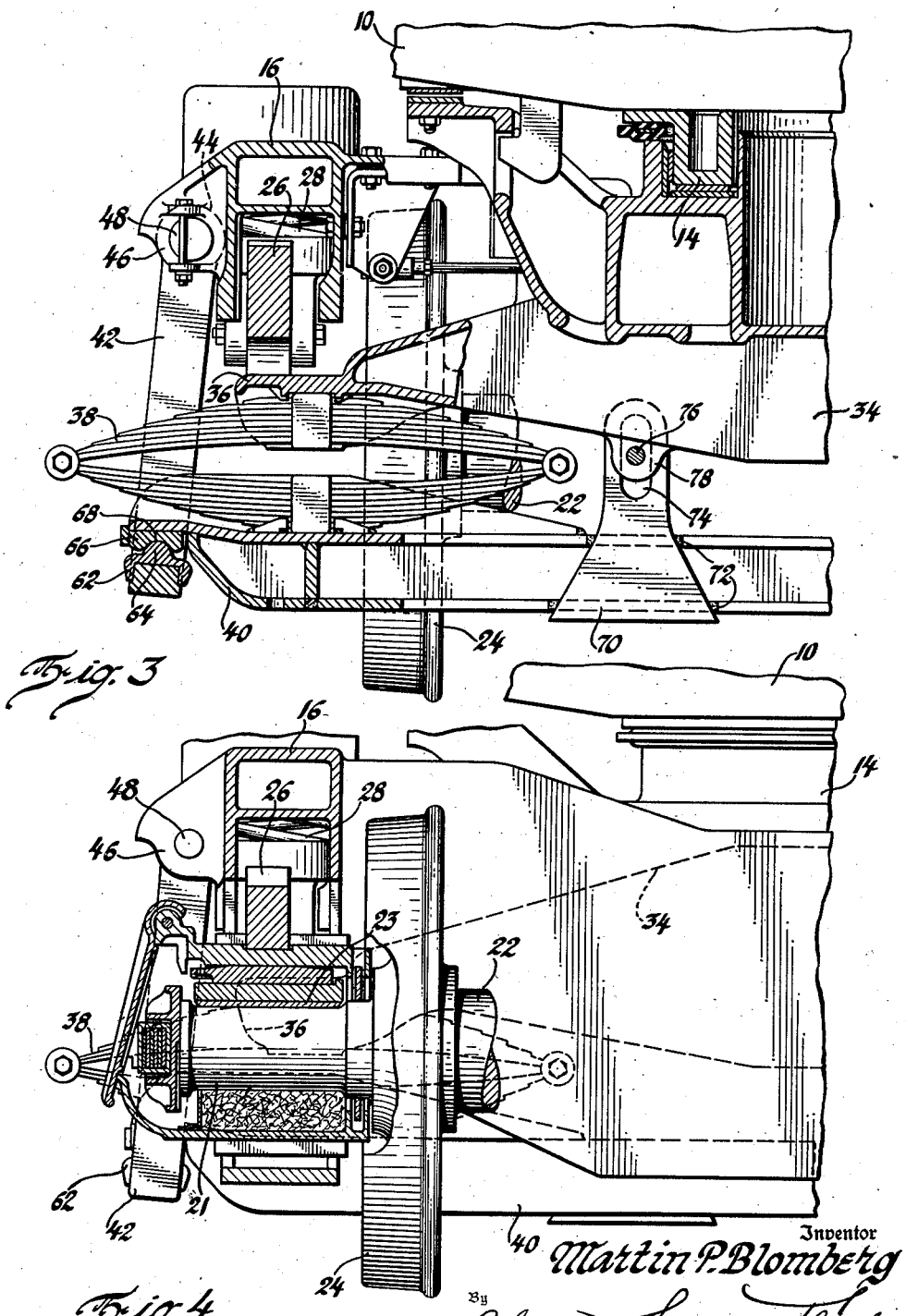

Feb. 6, 1940.     M. P. BLOMBERG     2,189,125
RAILWAY CAR TRUCK
Filed Jan. 29, 1938     3 Sheets-Sheet 3
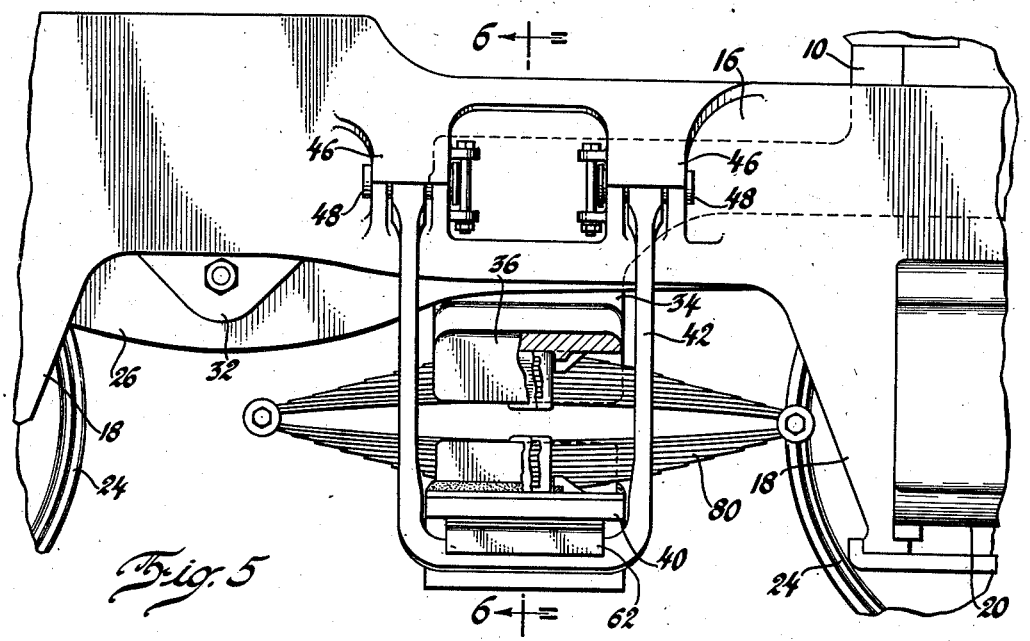
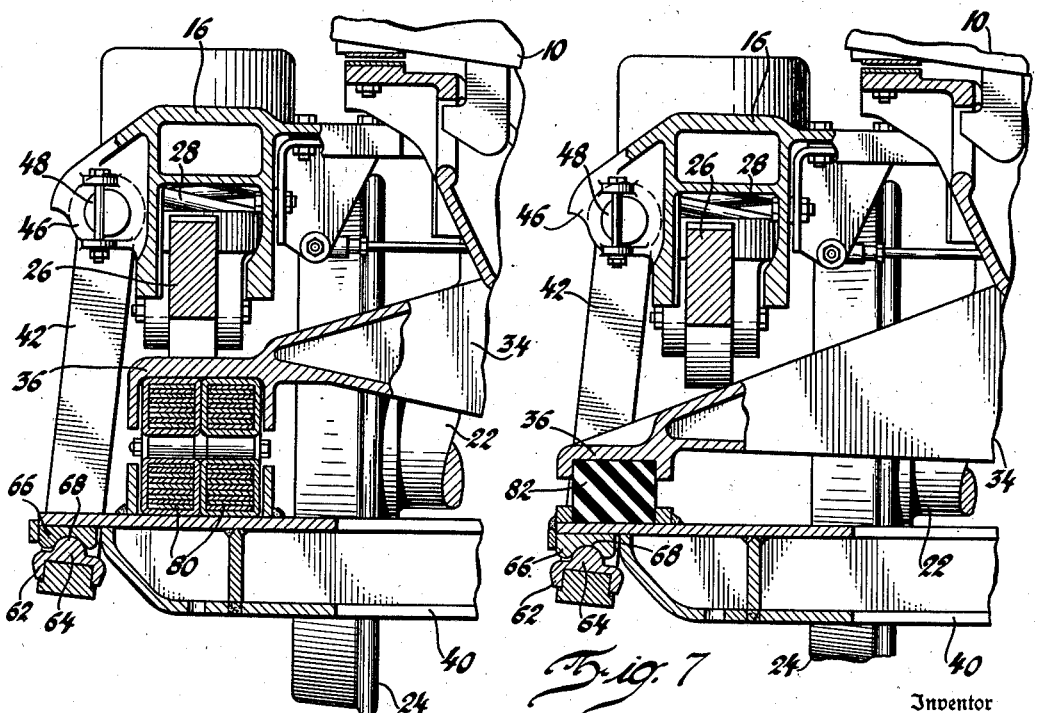
Inventor
Martin P. Blomberg
By
Blackmore, Spencer & Shirk
Attorneys Patented Feb. 6, 1940

2,189,125

UNITED STATES PATENT OFFICE 2,189,125

RAILWAY CAR TRUCK

Martin P. Blomberg, Hinsdale, Ill., assignor to General Motors Corporation, Detroit, Mich., a corporation of Delaware Application January 29, 1938, Serial No. 187,613

1 Claim. (Cl. 105—190)

This invention relates to improvements in railway car trucks of the type which employ a bolster or bolsters which are separate from the truck frame and are resiliently supported on a spring plank or planks or other members which in turn are suspended from the truck frame by swinghangers.

In this type of truck, it has heretofore been the practice to pivotally connect the swinghangers to the truck frame at points on or inside of the centerline of the journals, or more often, at points inside of the side frames which resulted in a location longitudinally approximately in line with the wheels, brake shoes and brake heads. This meant that the swinghangers were relatively close together transversely of the truck which was objectionable for the following reasons. First, due to unevenness and rail joints in tangent track, the wheels develop a lateral motion which is transmitted into the body resulting in what is known as body roll. Since the distance that the truck springs can be placed apart transversely of the truck is governed by the location of the swinghangers, the springs being located between or substantially in line with the swinghangers, when the latter are relatively close together, the springs are necessarily relatively close together, and when this is the case, the tendency of the body to roll is emphasized as a comparatively small lateral force will transfer a relatively large amount of the load from the springs on one side to the springs on the opposite side, and as the load is transferred the springs will compress, placing the body in a leaning position laterally. This may occur repeatedly to alternating sides and at times the body roll builds up considerably when rail joints and frequency characteristics of the springs harmonize. Second, due to placing the swinghangers in line with brake parts, a limiting factor occurs which prevents a designer from shortening the distance between the wheels longitudinally when such a reduction in distance is important to the design as a whole. Third, when the swinghangers are located inside the truck frame, it is difficult to obtain access to them for purposes of inspection, and in many cases when replacements are to be made the truck must be run over a pit or must be disconnected from the car body.

In my improved truck construction, I propose to locate the points where the swinghangers are pivotally connected to the truck frame on the outside of the truck frame. This permits spreading the resilient supporting members further apart which will reduce the body roll as a smaller proportion of the load is transferred from the springs on one side to those on the other and hence a smaller deflection and resultant leaning of the body takes place due to the wider spacing of the springs laterally, and with the increased stability against body roll the car will possess greatly improved riding qualities.

The spreading of the swinghangers and springs laterally will also result in lower unit stresses in the truck design and will also permit higher speeds when taking curves, as the leaning of the body with outside hung swinghangers is considerably less than with the conventional type of design with more closely spaced swinghangers.

In a six-wheel truck, especially when truck motors are carried, the outside hung swinghangers will permit a shortening of the overall spacing between wheels, which in some cases is the deciding factor as to whether the truck will be satisfactory for use on track having sharp curves.

Another advantage of locating the swinghangers on the outside of the frame is that they are readily accessible for purposes of inspection or replacement at all times.

Other advantages of my improved construction will be apparent upon reference to the following description and accompanying drawings, in which Figure 1 is a side elevational view of a six-wheel truck embodying my invention.

Figure 2 is a fragmentary side elevational view, on a larger scale, of one of the swinghangers and associated parts.

Figure 3 is a transverse sectional view, taken on the line 3—3 of Fig. 1, showing one-half of the truck on a still larger scale.

Figure 4 is a transverse sectional view, taken on the line 4—4 of Fig. 1.

Figure 5 is a view similar to Fig. 2 but showing a modification of the invention.

Figure 6 is a transverse sectional view, taken on the line 6—6 of Fig. 5.

Figure 7 is a transverse sectional view, similar to Figs. 3 and 6, but showing another form of the invention.

Figure 8 is a view somewhat similar to Fig. 7, but showing a form of the invention in which the spring planks are dispensed with.

The reference numeral 10 indicates the lower part or platform of a railway vehicle body, to which the truck 12 is secured by means of the usual center plate connection 14. 16 is a side member which forms a part of the truck frame, and extending downwardly therefrom are three pairs of pedestals 18 between each pair of which are received journal boxes 20 in which the journals 21 of the axles 22, upon which the wheels 24 are carried, rotate within journal bearings 23 supported in the journal boxes in the usual manner.

On each side of the truck are two qualizer bars 26, the outer ends of which rest on top of the journal boxes at the opposite ends of the truck, and the inner ends of which rest on top of the center journal box. As shown in Figs. 3 and 4, the equalizer bars are located beneath and partly inside the side member 16, which in the structure illustrated is of hollow box-like form in cross section, the bottom portion thereof being open so that the equalizer bars may lie inside the side member.

The truck frame is resiliently supported on the equalizer bars by means of pairs of coil springs 28, the upper ends of which bear against the under surface of the top wall of the side member and the lower ends of which are received in spring seats 30 which rest on top of each equalizer bar at the central portion thereof, being secured in such position by bolts 32.

The portion of the truck which is secured to the car body underframe by the center plate connection 14 is the truck bolster 34, which has outwardly extending portions 36 formed thereon, which portions lie beneath the side members and each of which forms a seat for the upper portion of an elliptic type multiple leaf spring 38, the lower portion of which rests upon a spring plank 40, there being two of such spring planks in each truck, each extending transversely across the truck in the spaces between the axles.

These spring planks are supported from the truck frame by means of swinghangers 42, which are of U-shape. The ends 44 of these swinghangers fit between pairs of lugs 46 which extend outwardly from the side members 16, being held in place therein by pins 48 which extend through openings formed in each swinghanger end 44 and each pair of lugs 46, as best shown in Fig. 2. In order to reduce friction, the pins 48 are received in bushings 50 and 52 formed of any suitable material, which bushings are pressed in the openings in the swinghanger ends and the pairs of lugs respectively, and the space between each pair of lugs 46 is closed at the top by a wall 54, which is shown as being cast integral with the lugs, which wall covers the spaces between the swinghanger ends and the lugs to keep water and dirt from falling into these spaces and damaging the bearing surfaces on the pins or bushings. The pins are retained against movement in one direction in the openings by the engagement of a head 56, formed on each pin, with one of the lugs 46, there being projections 58 formed on that lug, in which projections a bolt 60 is received, the head 56 of the pin being adapted to engage the bolt 60 to prevent movement of the pin in the opposite direction in the openings.

Mounted upon the central horizontally extending portion of the swinghangers is a bearing member 62 having a convex bearing surface 64 formed thereon, and secured to each end of the spring plank is a bearing member 66 having a concave bearing surface 68 formed thereon, the convex bearing surface 64 fitting within the concave bearing surface 68.

As is usual in truck constructions of this general type, the suspension of the spring planks from the truck frame side members by means of the swinghangers permits the spring planks and the truck bolster, which is supported thereon by the springs 38, to move laterally a limited amount with respect to the truck frame when the truck is being operated over rough or curved track, thereby improving its riding characteristics. However, in prior truck constructions of this type, it has been the practice to connect the swinghangers to the truck frame side members at points located on the inside of the side members or at points on or inside of the centers of the axle journals, which meant that the swinghangers were located relatively close together, which resulted in the objectionable conditions pointed out at the beginning of the specification.

In my improved truck construction, by locating the points where the swinghangers are pivotally connected to the truck frame side members on the outside of the latter, the swinghangers are located considerably farther apart than has been the case in prior art structures. This produces a truck construction which has riding characteristics which are far superior to those of the usual truck construction. The improvement is brought about because of the fact that when the swinghangers are spread farther apart, the spring planks may be made longer and consequently the springs may be located farther apart. In such a construction, when the lateral motion of the wheels tends to make the body roll, the fact that the springs are spaced farther apart than usual results in each spring being compressed a lesser amount as the weight of the body is shifted from one side of the truck to the other, and consequently the body will not be permitted to lean as much to either side as is the case in the usual construction, and the riding qualities are therefore greatly improved.

As shown in Fig. 3, the points where the springs 38 are connected to the bolster and to the spring planks are directly beneath the side member 16, and since as indicated in Fig. 4, the center of the axle journal 21 is likewise directly beneath the side member, this results in these spring connection points being in substantial alignment with the centers of the axle journals, which is a further spacing apart of such springs than has been accomplished in the prior art, so far as I am aware.

Another advantage of my improved construction is that when the swinghangers are pivotally connected to the truck frame side members at points on the outside of the latter and outside the centers of the axle journals, they are readily accessible for purposes of inspection or replacement without necessitating running the car over a pit or detaching the truck from the body, as is the case with the usual construction.

A still further advantage of locating the swinghangers on the outside of the truck frame side members and beyond the centers of the axle journals is that in this location they are not in line with the brake shoes or other parts, and consequently the length of the truck may be reduced below that required for a truck wherein the swinghangers are located inside the truck frame side members or inside the axle journals.

In the arrangement shown in Fig. 3, since the points where the springs are connected to the spring planks are located quite some distance inside the points where the spring planks are supported by the swinghangers, this results in the spring planks serving as beams supported at their ends with the load applied intermediate the points of support. While the spring planks are made strong enough to present an ample margin of safety under normal operating conditions, it is conceivable that under some unusual condition like striking some obstacle they might become broken, and no doubt would drop down and might if they struck some part of the roadbed cause the train to become derailed. As a safety measure, to temporarily support the spring planks should they become broken during service, safety straps 70 are secured to the spring planks in any suitable manner, as by welding 72, and project upwardly therefrom, there being slots 74 formed in the upper ends of the safety straps, through which slot pins 76 extend, the pins being supported in lugs 78 formed on the underside of the bolster 34, the slots permitting considerable vertical movement of the bolster relative to the spring planks, and there being sufficient clearance between the pins and the edges of the slots to permit a limited amount of lateral movement of the spring planks relative to the bolster.

While it might be considered desirable to move the springs still further out, so that the points where they are connected to the spring planks would be closer to the points where the spring planks are supported by the swinghangers, since this would not only reduce the bending moment of the spring planks but would also further increase the stability of the truck, it is impossible to do this when the springs are placed in the position shown in Fig. 3, since if they were moved outwardly any further their outer ends would project beyond the third rail clearance line. However, by changing the position of the springs so that they extend parallel with and underneath the truck frame side members 16, as shown in Figs. 5 and 6, it will be seen that the points where the springs 80 are connected to the spring planks are moved outwardly and closer to the points where the spring planks are supported by the swinghangers and therefore not only is the bending moment of the spring planks reduced, but the stability of the truck is also increased because of the wider spread of the springs.

If it is desired to avoid having the spring planks serve as beams, and to have them serve solely as separators to hold the swinghangers in proper position, it would be necessary to support the truck bolster on the spring planks at points located in line with the points where the spring planks are supported on the swinghangers. In such an arrangement, it probably would be impossible to use leaf or coil springs between the bolster and spring planks because the minimum vertical distance within which such springs could be placed is such that the truck side frame members would have to be located higher than is practicable. Therefore it may be desirable to employ an arrangement such as is shown in Fig. 7, wherein the springs between the bolster and spring planks are eliminated, and in their place blocks 82 of any suitable resilient material are used, these blocks being connected to both the spring planks and bolster, and serving to resiliently support the latter on the former. It will be seen that in this construction, since the blocks are located immediately over the points where the spring planks are supported by the swinghangers, this results in the load from the bolster being applied directly through the spring planks in a vertical direction to the points of support of the spring planks, so that the latter do not function as beams but serve merely as spacers or separators to hold the swinghangers in correct angular position. It will also be seen that in this arrangement the points where the bolster is supported on the spring planks are located still further apart than in either of the previously described constructions, and this results in an even greater stability of the truck.

While in the foregoing the invention has been described as being utilized in connection with structures wherein spring planks are employed, it is to be understood that it may also be used in truck constructions wherein the spring planks are dispensed with. Such an embodiment of the invention is shown in Fig. 8, wherein in lieu of the spring planks, supporting members 84 are mounted upon the swinghangers, in the same manner as the ends of the spring planks are in the previously described structures, and the bolster is supported on the members 84, there being blocks 86 of any suitable resilient material interposed between the two, similar in this respect to the construction shown in Fig. 7. In order to maintain the members 84 in proper position, downwardly extending guide portions 88 are formed on the underside of the ends of the bolster, and the members 84 bear against these guide portions, the contacting surfaces of the two parts being of course machined so that they may move relative to one another with a minimum of friction. Flanges 90 formed on the members extend around the sides of the guide portions to prevent transverse movement of the members 84 relative to the guide portions 88, but it will be seen that during operation of the truck, as the resilient material 86 is compressed, the bolster 34 will be free to move up or down with respect to the members 84 to accommodate such action. As stated in connection with the form of the invention shown in Fig. 7, when the bolster is supported directly over the points of support on the swinghangers, the sole function of the spring planks is to serve as spacers or separators which hold the swinghangers in proper position. In the form of the invention shown in Fig. 8, since the guiding portions 88 provided on the bolster serve the function of holding the swinghangers in proper position, it therefore is unnecessary to use the spring planks.

While I have shown and described specific embodiments of my invention, it will be understood that various changes in details of construction and arrangement may be made without departing from the spirit and scope of the appended claims. For example, while I have shown my invention as being employed in connection with a six-wheel truck it will be obvious that it might be used equally as well in trucks having more or less than that number of wheels.

I claim:

In a car truck, a frame including side members, journal boxes guided in said side members, equalized bars the ends of which rest upon the journal boxes and the intermediate portions of which extend immediately beneath the side members, a bolster movable relative to the frame and having projections extending under said equalizer bars, a spring plank located under said bolster, swinghangers supporting the spring plank from the side members, said swinghangers being located on the outside of the side members, and resilient members connecting the projections on the bolster with the spring plank, the points of connection of the resilient members with the projections on the bolster and the spring plank being located substantially in line with the equalizer bars.

MARTIN P. BLOMBERG.